United States Patent
Wu et al.

(10) Patent No.: US 8,254,104 B2
(45) Date of Patent: Aug. 28, 2012

(54) TILTING PORTABLE ELECTRONIC DEVICE

(75) Inventors: Kun-Tsan Wu, Shindian (TW); Wei-Shan Hu, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 248 days.

(21) Appl. No.: 12/825,488

(22) Filed: Jun. 29, 2010

(65) Prior Publication Data

US 2011/0176262 A1    Jul. 21, 2011

(30) Foreign Application Priority Data

Jan. 15, 2010 (CN) .......................... 2010 1 0300334

(51) Int. Cl.
*H05K 5/00* (2006.01)
*H05K 7/00* (2006.01)
*H04M 1/00* (2006.01)

(52) U.S. Cl. ........... 361/679.3; 361/679.09; 361/679.26; 361/679.27; 361/679.56; 455/575.4

(58) Field of Classification Search ............. 361/679.09, 361/679.26, 679.27, 679.3, 679.56; 455/575.4
See application file for complete search history.

(56) References Cited

U.S. PATENT DOCUMENTS

| 8,077,854 B2 * | 12/2011 | Ou et al. ........................ 379/330 |
| 2007/0105606 A1 * | 5/2007 | Yoon et al. ................. 455/575.4 |
| 2008/0161075 A1 * | 7/2008 | Kim et al. .................. 455/575.4 |
| 2008/0230437 A1 * | 9/2008 | Ou et al. ....................... 206/701 |

* cited by examiner

*Primary Examiner* — Anthony Haughton
(74) *Attorney, Agent, or Firm* — Altis Law Group, Inc.

(57) ABSTRACT

A tilting portable electronic device includes a housing, a cover forming two spaced stopping blocks, at least one connecting member rotatably connecting the housing and the cover, a rotating member rotatably connecting the housing and the cover, and an elastic member securing with the rotating member and having a resisting section slidably resisting against the cover. When the cover is opened relative to the housing, the connecting member and the rotating member rotates to support an end of the cover slanted relative to the housing, after the cover slides a predetermined distance, the elastic member causing the cover to slide automatically until the resisting section slides to the other stopping block.

18 Claims, 5 Drawing Sheets

TILTING PORTABLE ELECTRONIC DEVICE

CROSS-REFERENCE TO RELATED APPLICATIONS

This application is one of the eight related co-pending U.S. patent applications listed below. All listed applications have the same assignee and were concurrently filed herewith. The disclosure of each of the listed applications is incorporated by reference into all the other listed applications.

| application Ser. No. | Title | Inventors |
| --- | --- | --- |
| 12/825,459 | TILTING PORTABLE ELECTRONIC DEVICE | Kun-Tsan Wu et al. |
| 12/825,462 | TILTING PORTABLE ELECTRONIC DEVICE | Kun-Tsan Wu et al. |
| 12/825,471 | TILTING PORTABLE ELECTRONIC DEVICE | Kun-Tsan Wu et al. |
| 12/825,474 | TILTING PORTABLE ELECTRONIC DEVICE | Kun-Tsan Wu et al. |
| 12/825,477 | TILTING PORTABLE ELECTRONIC DEVICE | Kun-Tsan Wu et al. |
| 12/825,483 | TILTING PORTABLE ELECTRONIC DEVICE | Kun-Tsan Wu et al. |
| 12/825,484 | TILTING PORTABLE ELECTRONIC DEVICE | Kun-Tsan Wu et al. |
| 12/825,488 | TILTING PORTABLE ELECTRONIC DEVICE | Kun-Tsan Wu et al. |

BACKGROUND

1. Technical Field

The present disclosure relates to tilting portable electronic devices.

2. Description of Related Art

Conventional portable electronic devices can be classified into three different categories, bar-type devices, rotating-type devices, and sliding-type devices.

All three types of these electronic devices have the same following problems. When a user wants to watch a display of the electronic device resting on a table, they must use external support to hold it in a tilted position to give the display a better viewing angle. Alternatively, the user may hold the electronic device with his hands to get the proper viewing angle, however, it may become uncomfortable after a long time of viewing.

Therefore, there is room for improvement within the art.

BRIEF DESCRIPTION OF THE DRAWINGS

Many aspects of the present tilting portable electronic device can be better understood with reference to the following drawings. The components in the various drawings are not necessarily drawn to scale, the emphasis instead being placed upon clearly illustrating the principles of the present tilting portable electronic device. Moreover, in the drawings, like reference numerals designate corresponding parts throughout the diagrams.

DETAILED DESCRIPTION

Figure 1:
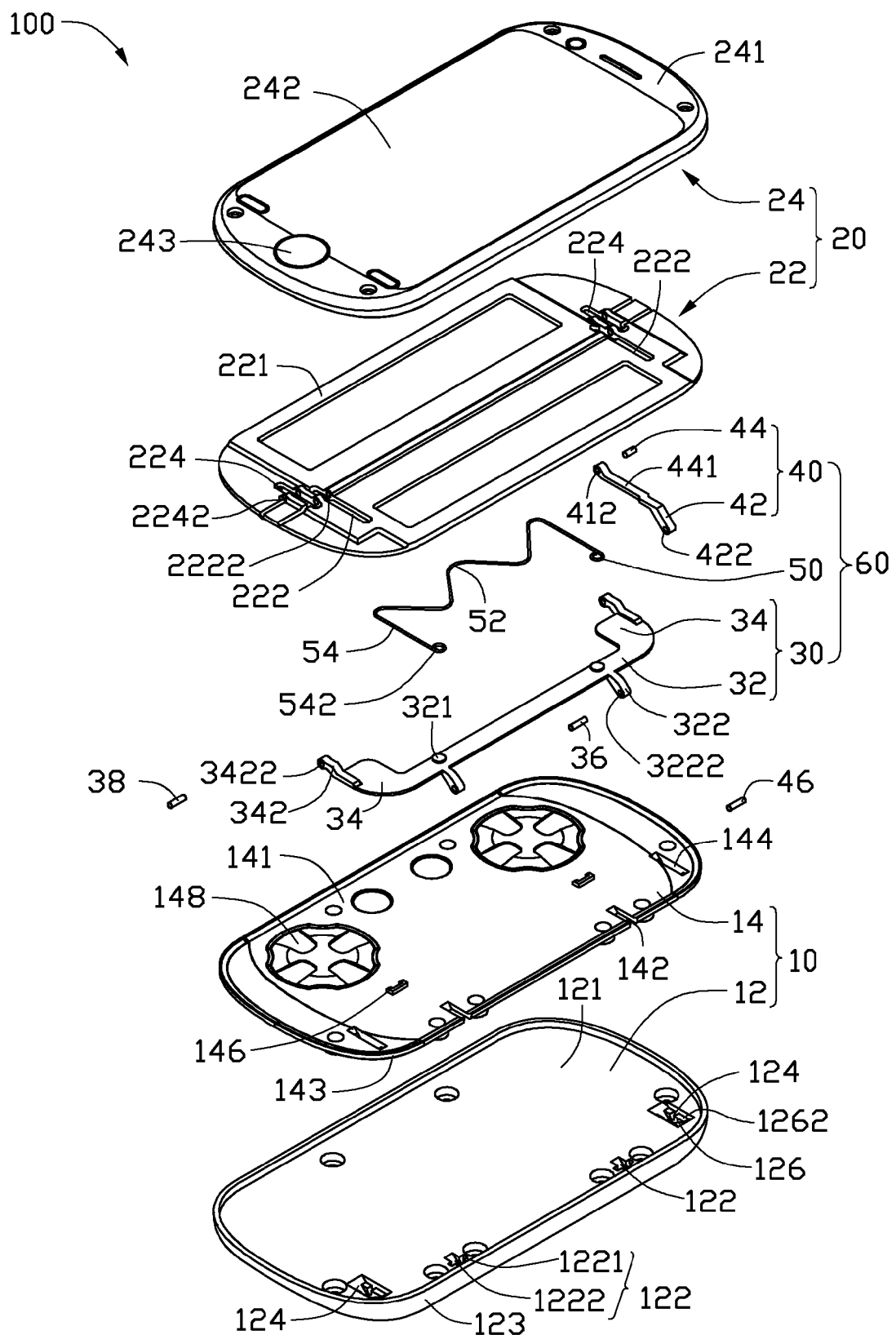
FIG. 1 is an exploded view of a tilting portable electronic device, according to an exemplary embodiment.

FIG. 1 shows an exemplary embodiment of a tilting portable electronic device 100, such as mobile phones, personal digital assistants (PDAs), digital cameras, including a housing 10, a cover 20, and a swinging assembly 60 connecting the housing 10 and the cover 20.

The housing 10 includes a lower base 12 and an upper base 14. The lower base 12 has a first upper surface 121, two spaced latching slots 122 and two engaging slots 124. The latching slots 122 are located adjacent to a first end wall 123, and the two engaging slots 124 are oppositely positioned at the two corners of the lower base 12 abutting the first end wall 123. Each latching slot 122 is substantially cross shaped and has a first slot section 1221 extending substantially along the first end wall 123, and a second slot section 1222 extending substantially perpendicularly with the first slot section 1221. Each engaging slot 124 receives a lug 126 from the bottom. The lug 126 defines a first connecting hole 1262 substantially parallel to the first end wall 123.

The upper base 14 has a second upper surface 141 and a second end wall 143. The upper base 14 defines two cutouts 142 and two engaging holes 144. The cutouts 142 are defined in the second end wall 143 and extend toward the opposite end wall. The cutouts 142 correspond in location to the second slot sections 1222 of the lower bases 12. The engaging holes 144 are arranged substantially adjacent to the two sides of the upper base 14 and correspond in location to the engaging slots 124. Two stoppers 146 and two keypads 148 are formed on the second upper surface 141. The two stoppers 146 are positioned along a central axis of the upper base 14, substantially parallel with the second end wall 143. The two keypads 148 are positioned opposite to the second end wall 143.

The cover 20 includes a sliding plate 22 and a detachable top plate 24. The sliding plate 22 has a first surface 221 and an opposite second surface 223. The sliding plate 22 defines two first connecting grooves 222 oppositely arranged substantially adjacent at two sides of the sliding plate 22, and also two second connecting grooves 224 oppositely arranged substantially adjacent to two sides of the sliding plate 22. Each connecting groove 222 and 224 extend along the sliding direction of the sliding plate 22 and run through the first surface 221 to the second surface 223. Each first groove 222 defines a second connecting hole 2222 in the inner sidewall. Each second groove 224 defines an assembling hole 2242 in the inner sidewall. Referring further to the FIG. 2, the second surface 223 has two substantially parallel stopping blocks 226 formed at the middle, substantially perpendicular to the connecting grooves 222 and 224. A resisting area 2262 is defined between the two stopping blocks 226. The top plate 24 has an outer surface 241 having a display 242 and a plurality of function keys 243 formed thereon.

The swinging assembly 60 includes a rotating member 30, two connecting members 40 and an elastic member 50. The rotating member 30 is substantially U-shaped and includes a plate portion 32 and an extending arm 34 oppositely laterally extending from each end of the plate portion 32. The plate portion 32 forms two latching poles 321 thereon, and two opposite first hinge portions 322 laterally extending from one end wall. The two latching poles 321 secure the elastic member 50 to the plate portion 32. Each hinge portion 322 defines a first hinge hole 3222. The hinge portion 322 can pass through the cutout 142 of the upper base 14 and match with the second slot section 1222 of the latching slot 122. A first pin 36 passes through the first hinge hole 3222 and latches into the second slot section 1222, rotatably connecting the rotating member 30 with the lower base 12. The extending arm 34 forms a branch 342 at the distal end, and the branch 342 defines a second hinge hole 3422. The branch 342 passes through the first connecting groove 222 of the sliding plate 22, with the second hinge hole 3422 aligning with the second connecting hole 2222. A second pin 38 passes through the second hinge hole 3422 and the second connecting hole 2222 to rotatably connect the rotating member 30 with the sliding plate 22.

The connecting member 40 is substantially a bar and includes a first connecting section 41 and a second connecting section 42, which is slantingly connected with the first connecting section 41. The first connecting section 41 defines a first rotating hole 412 at one distal end. The first connecting section 41 can be received in the second connecting groove 224 of the sliding plate 22, with the first rotating hole 412 aligning with the assembling hole 2242 of the sliding plate 22. A third pin 44 passes through the first rotating hole 412 and the assembling hole 2244, rotatably connecting the connecting member 40 with the sliding plate 22. The second connecting section 42 defines a second rotating hole 422 at another distal end thereof. The second connecting section 42 can pass through the engaging hole 144 of the upper base 14 to engage with the lug 126, with the second rotating hole 422 aligning with the first connecting hole 1262. A fourth pin 46 passes through the second rotating hole 422 and the first connecting hole 1262, rotatably connecting the connecting member 40 with the lower base 12.

The elastic member 50 is a linear spring and including a resisting section 52 and two side sections 54 perpendicularly connecting respectively to two ends of the resisting section 52. The resisting section 52 is wave shaped and can be deformed. The side section 54 is a strip and can be biased. Each side section 54 forms a ring 542 at the distal end to fix with the latching poles 32 of the rotating member 30.

Figure 2:
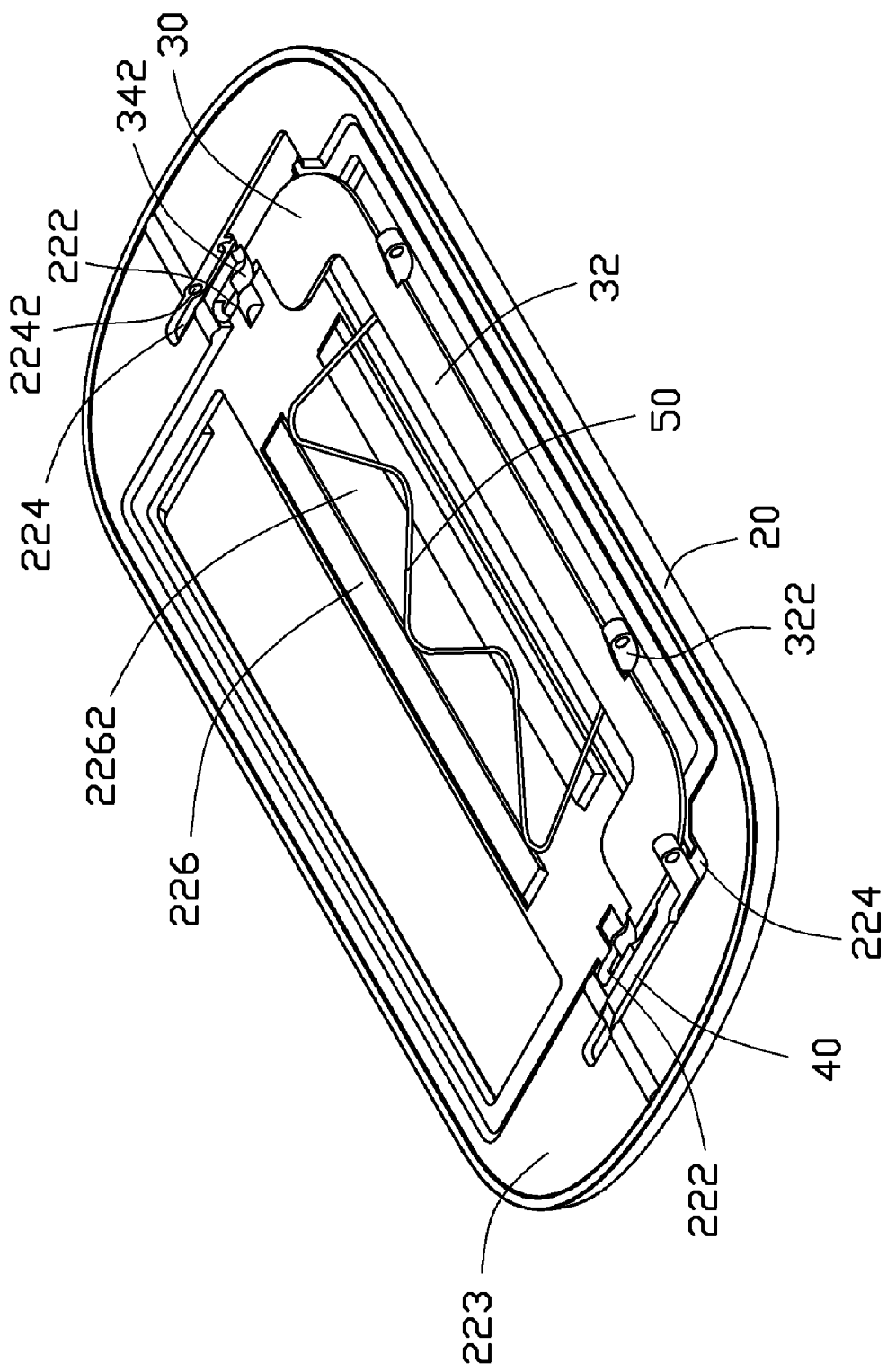
FIG. 2 is a schematic view the cover of the electronic device shown in FIG. 1 in assembling.
Figure 3:
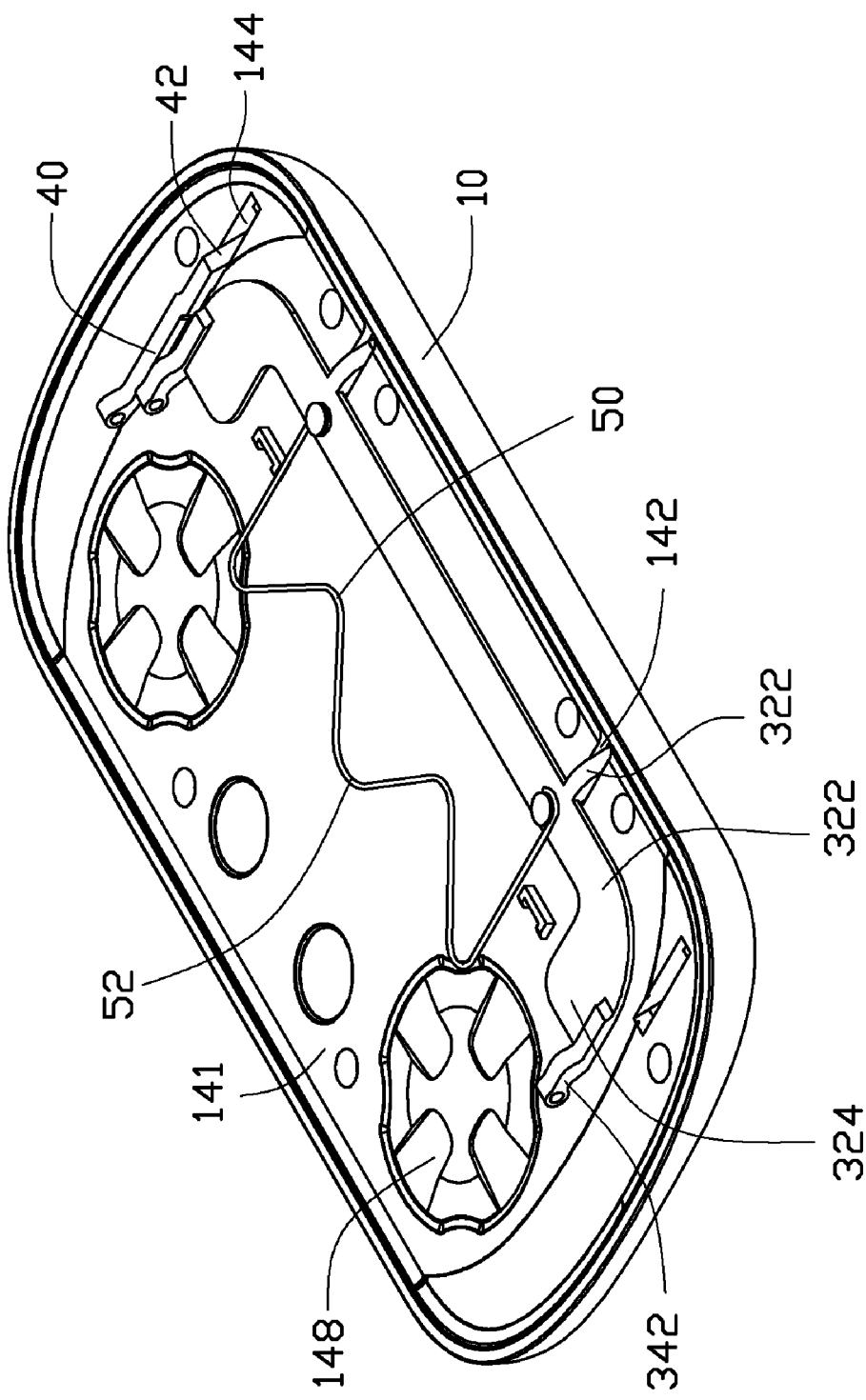
FIG. 3 is a schematic view of a housing of the electronic device shown in FIG. 1 in assembling.
Figure 4:
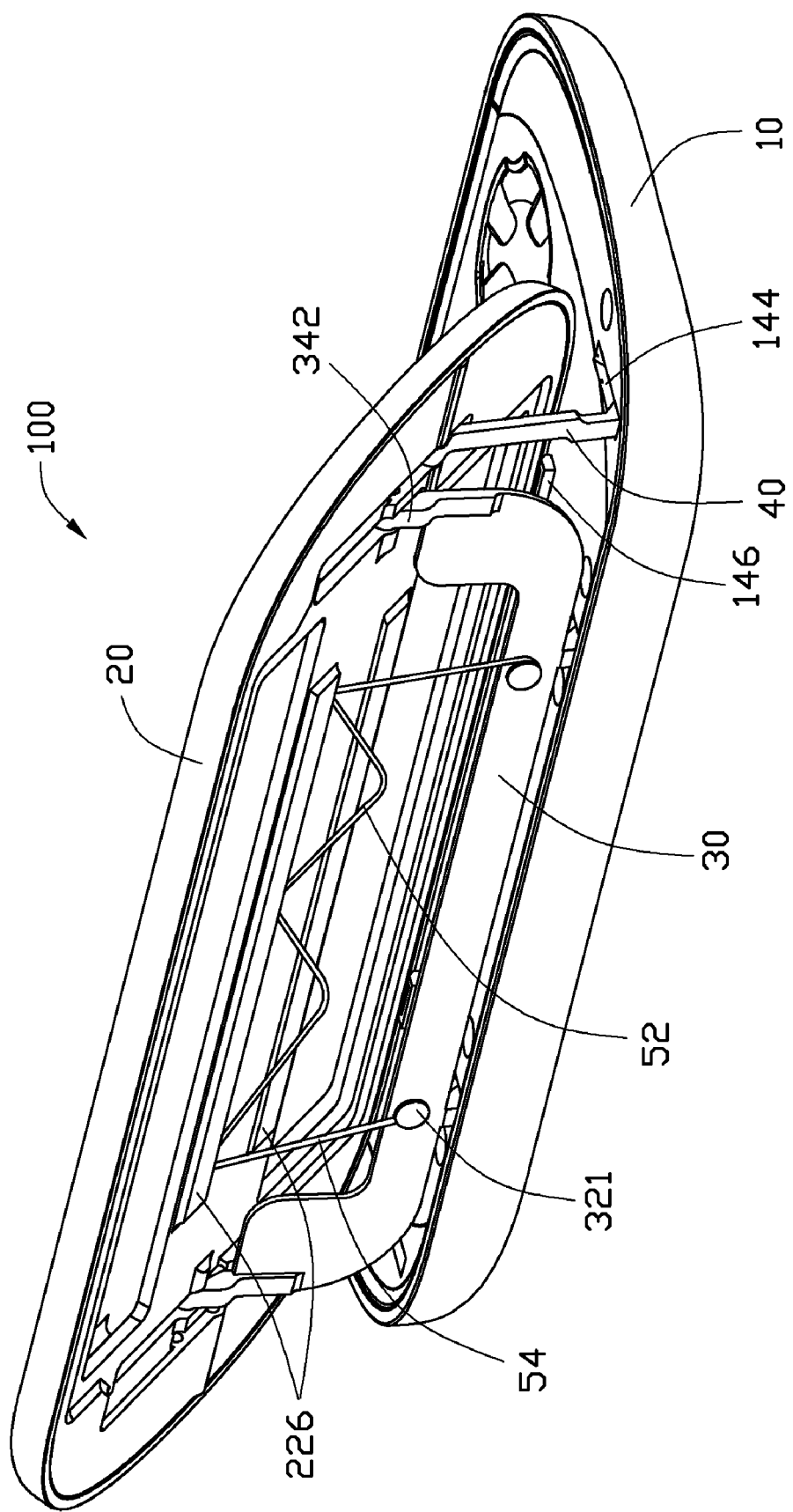
FIG. 4 is a schematic view of the electronic device shown in FIG. 1 in a closed state.
Figure 5:
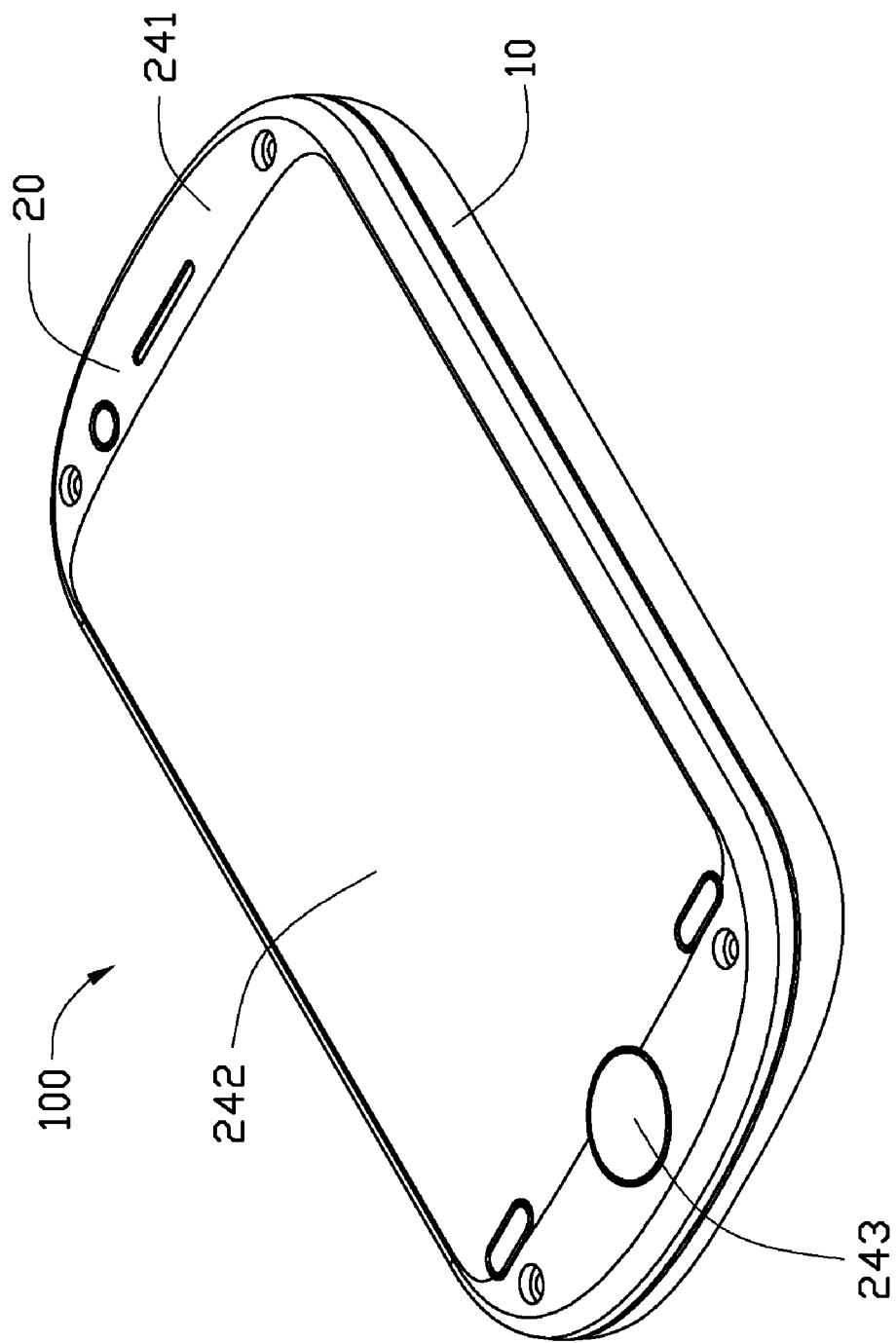
FIG. 5 is a schematic view of the electronic device shown in FIG. 1 in an open state.

Referring to FIGS. 2 to 4, to assemble the portable electronic device 100, the elastic member 50 is secured to the rotating member 30, with the rings 542 of the elastic member 50 respectively coiling around the latching poles 321 of the plate portion 32 and the elastic member 50 tilts relative to the rotating member 30.

The rotating member 30 is assembled in the housing 10, with the two hinge portions 322 respectively matching with the second slot sections 1222 of the latching slots 122. The first pin 36 passes through the first hinge hole 3222 and latches with the second slot section 1222, rotatably connecting the rotating member 30 with the lower base 12.

The two connecting members 40 are installed in the lower base 12, with second connecting section 42 engaging with the lug 126, and the second rotating hole 422 aligning with the first connecting hole 1262. The fourth pin 46 passes through the second rotating hole 422 and the first connecting hole 1262, rotatably connecting the connecting member 40 with the lower base 12.

The upper base 14 engages with the lower base 12, with two hinge portions 322 of the plate portion 32 correspondingly extending from the two cutouts 142 of the upper base 14, the second connecting section 42 of each connecting member 40 correspondingly extends from the engaging holes 144 of the upper base 14.

The rotating member 30 is assembled with the sliding cover 22. The branch 342 of each extending arm 34 passes through the first connecting groove 222 from the second surface 223 of the sliding plate 22, and the second hinge hole 3422 aligns with the second connecting hole 2224. The second pin 38 passes through the second hinge hole 3422 and the second connecting hole 2224, rotatably connects the rotating member 30 with the sliding plate 22.

The two connecting members 40 are assembled into the sliding plate 22, and the first connecting section 41 of each connecting member 40 passes the second connecting groove 224 of the sliding plate 22. The first rotating hole 412 aligns with the assembling hole 2244 of the sliding plate 22. The third pin 44 passes through the first rotating hole 412 and the assembling hole 2244, rotatably connects the connecting member 40 with the sliding plate 22.

The top plate 24 is mounted to the sliding plate 22. The electronic device 100 is in a closed configuration, where the resisting section 52 of the elastic section 50 is accommodated in the resisting area 2262 of the sliding plate 22 and resists against one of the stopping blocks 226. The hinge portions 322 of the rotating member 30 are respectively received in the cutouts 142 of the upper base 14. The branches 342 are received in the first connecting grooves 222. The second connecting section 42 of each connecting member 40 is received in the engaging hole 144. The first connecting section 41 of each connecting member 40 is received in the second connecting groove 224.

Referring to FIG. 4, to open the cover 20. The cover 20 can be pushed with an external force, making the distal end slide along the second upper surface 141 of the upper base 14, enabling the two connecting members 40 and the rotating member 30 to rotate as a unit, tilting the opposite end of the cover 20. At the same time, the elastic member 50 rotates along with the rotating member 30. The resisting section 52 of the elastic member 50 resists against and slides in the resisting area 2262, thus the side section 54 of the elastic member 50 is compressed, and potential energy is accumulated. After the resisting section 52 slides over a predetermined distance in the resisting area 2262, the elastic member 50 releases potential elastic energy to drive the cover 20 to automatically slide until the resisting section 52 resists against the other stopping block 226. Meanwhile, the end sliding along the second upper surface 141 of the housing 10 resists against the two stoppers 146 of the housing 10 and stops sliding. The cover 20 is in a slanted position relative to the housing 10.

To close the cover 20, the end of the cover not abutting the second upper surface 141 of the cover 20 is pressed down with an external force, and the other end abutting on the second upper surface 141 of the cover 20 slides until the cover 20 substantially abuts the upper surface 141. In the process, the resisting section 52 of the elastic member 50 slides and returns back to original position.

It is noteworthy that, one of the two connecting members 40 can be omitted. The rotating member 30 can be formed into two separated extending arms 34. Moreover, one of the two extending arms 34 can be omitted, and the other secures with the elastic member 50.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:
1. A tilting portable electronic device, comprising:
a housing defining two latching slots;
a cover forming two spaced stopping blocks;

at least one connecting member rotatably connecting the housing and the cover;
a rotating member rotatably connecting the housing and the cover, the rotating member including two first hinge portions received in the latching slots, each latching slot including a first slot section and a second slot section perpendicular with the first slot section;
an elastic member securing with the rotating member and having a resisting section slidably resisting against the cover; wherein:
when the cover is opened relative to the housing, the connecting member and the rotating member rotate to support an end of the cover tilted relative to the housing, the elastic member is compressed, the resisting section slides from one stopping block towards to the other stopping block, after the cover slides a predetermined distance, the elastic member causing the cover to slide automatically until the resisting section resists against the other stopping block.

2. The tilting portable electronic device as claimed in claim 1, wherein the rotating member includes a plate portion forming the two first hinge portions to rotatably connect with the housing.

3. The tilting portable electronic device as claimed in claim 2, wherein the plate portion forms two latching poles, the elastic member includes two side sections perpendicularly connecting to the resisting section, each side section forms a ring at the distal end to fix with the latching pole.

4. The tilting portable electronic device as claimed in claim 2, wherein the housing includes a lower base and an upper base, the lower base defines the two latching slots to receive the two first hinge portions, the upper base defines two cutouts to correspondingly engage the two latching slots.

5. The tilting portable electronic device as claimed in claim 4, wherein the cutout corresponds to the first slot section for the first hinge portion passing through.

6. The tilting portable electronic device as claimed in claim 5, wherein the lower base defines two engaging slots to rotatably respectively receive two said connecting members, the upper base defines two engaging holes to correspondingly engage the engaging slots for the connecting members passing through.

7. The tilting portable electronic device as claimed in claim 4, wherein the housing forms two stoppers on one surface of the upper base to resist against one end of the cover after the cover slides a predetermined distance.

8. The tilting portable electronic device as claimed in claim 1, wherein the cover includes a sliding plate, the two stopping blocks are parallely formed on the sliding plate, perpendicularly with the sliding direction of the sliding plate.

9. The tilting portable electronic device as claimed in claim 8, wherein the sliding plate defines two first connecting grooves, the rotating member includes two extending arms to respectively extend into the two first connecting grooves.

10. The tilting portable electronic device as claimed in claim 9, wherein each first connecting groove defines a connecting hole at the inner sidewall, each extending arm defines a hinge hole, the extending arm passes through the first connecting groove, a pin passes through the connecting hole and the hinge hole to rotatably connect the rotating member with the sliding member.

11. The tilting portable electronic device as claimed in claim 8, wherein the sliding plate defines two second connecting grooves to engage with the two connecting members.

12. The tilting portable electronic device as claimed in claim 8, wherein the cover includes a top plate to engage with the sliding plate.

13. The tilting portable electronic device as claimed in claim 8, wherein the connecting member is substantially a bar and includes a first connecting section and a second connecting section slantingly connecting with the first connecting section.

14. The tilting portable electronic device as claimed in claim 8, wherein the elastic member is a linear spring.

15. The tilting portable electronic device as claimed in claim 8, wherein the two stopping blocks defines a resisting area on the sliding plate, the resisting section of the elastic member abuts in the resisting area.

16. A tilting portable electronic device, comprising:
a housing defining two latching slots and two engaging slots;
a cover defining two first connecting grooves and two second connecting grooves;
a rotating member including two first hinge portions and two extending arms, each first hinge portion rotatably connected to one of the first connecting grooves, each extending arm rotatably received in one of the latching slots;
two connecting members, opposite ends of each connecting member rotatably received in each engaging slot of the housing and each second connecting groove of the cover;
an elastic member securing with the rotating member, the elastic mmeber including a resisting section and two side sections connected to two ends of the resisting section, the side sections securing with the rotating member, the resisting section being wave shaped and deformedly sliding on the cover;
wherein when the cover is opened relative to the housing, the connecting members and the rotating member rotate to support an end of the cover tilted relative to the housing, the elastic member is compressed, after the cover slides a predetermined distance, the elastic member causing the cover to slide automatically.

17. The tilting portable electronic device as claimed in claim 16, wherein two parallel spaced stopping blocks are formed on the cover, the stopper blocks are substantially perpendicular to the first connecting grooves and the second connecting grooves, and the resisting section slides from one stopping block towards to the other stopping block.

18. The tilting portable electronic device as claimed in claim 16, wherein each latching slot including a first slot section and a second slot section perpendicular with the first slot section.

* * * * *